Aug. 10, 1937. E. H. MUELLER 2,089,617
LOCKING VALVE
Filed Dec. 24, 1934 2 Sheets-Sheet 1
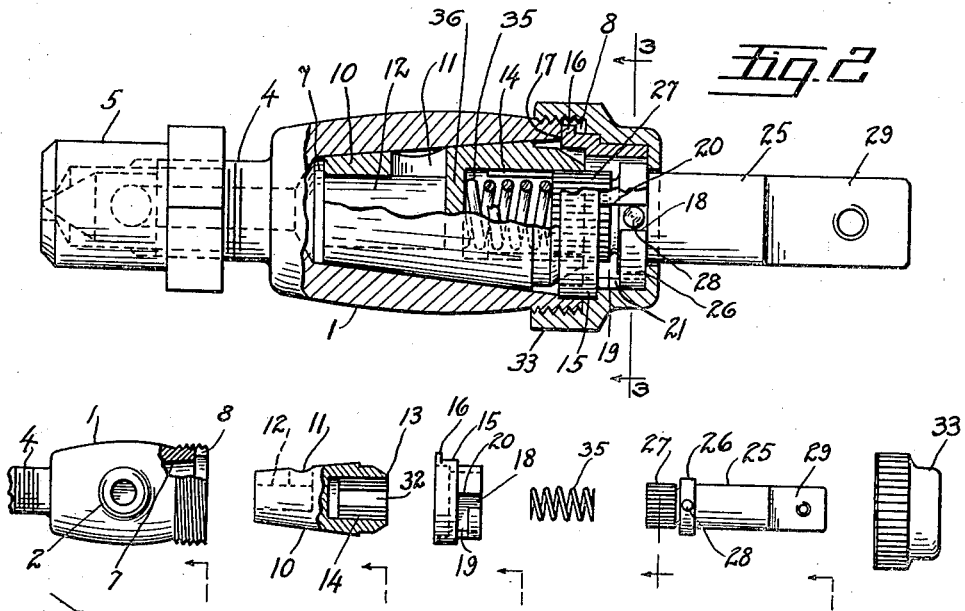
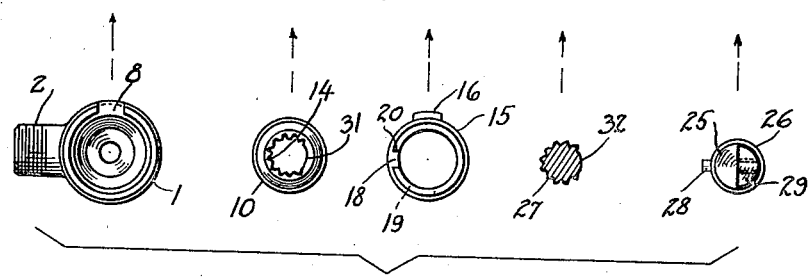
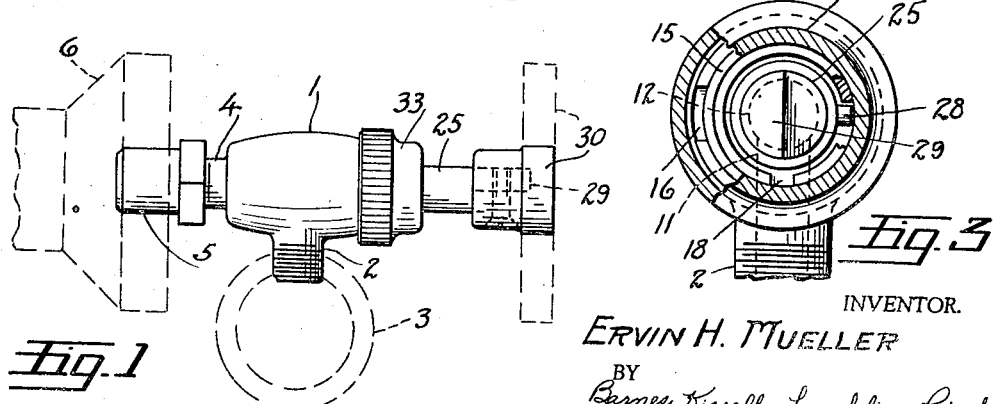
INVENTOR.
ERVIN H. MUELLER
BY
Barnes, Kisselle, Laughlin & Raisch
ATTORNEYS.

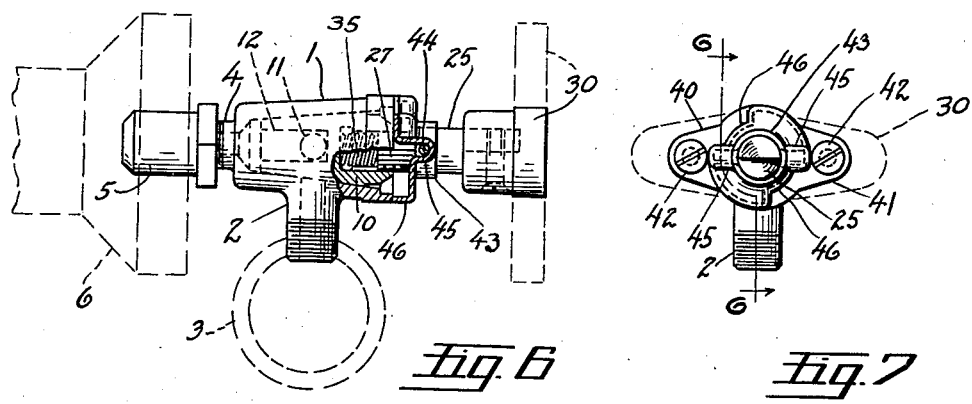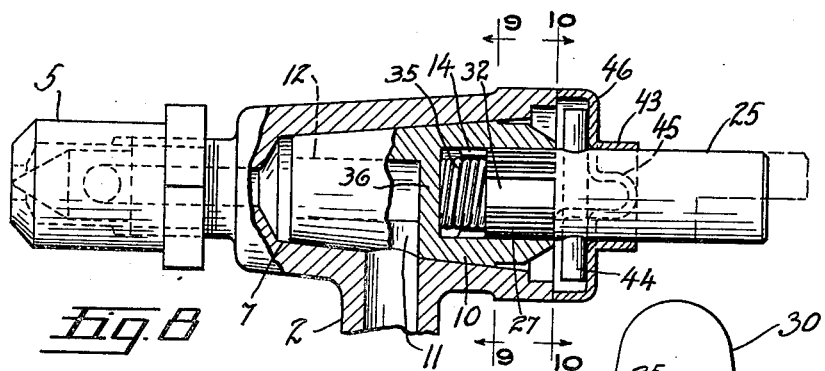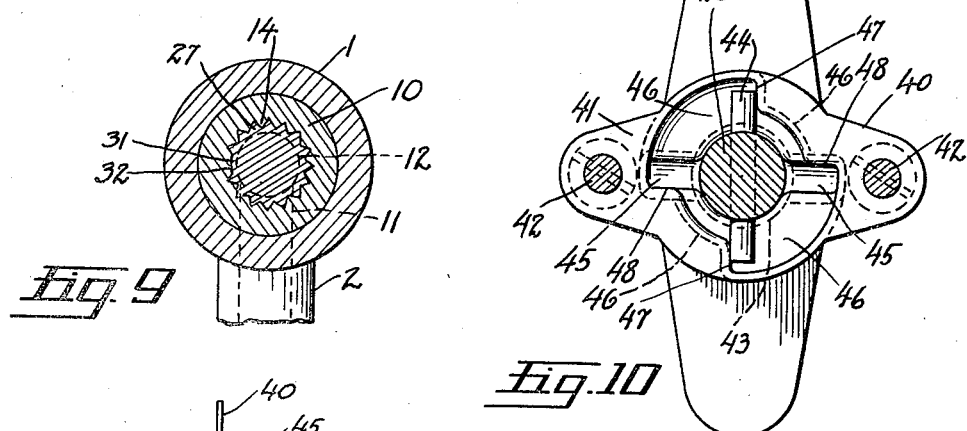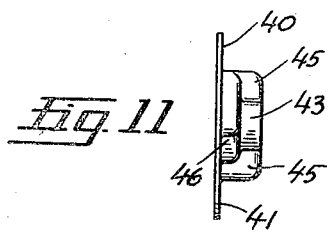

Patented Aug. 10, 1937

2,089,617

UNITED STATES PATENT OFFICE 2,089,617

LOCKING VALVE

Ervin H. Mueller, Detroit, Mich.

Application December 24, 1934, Serial No. 758,975

14 Claims. (Cl. 251—165)

This invention has to do with valves and is directed particularly to improved valve structures such as may be employed in gas lines.

The principal object of the invention is to provide an improved structure in valves of the locking type. Such locking valves may advantageously be used on gas ranges or other gas burning or heating devices and when the valve is turned off the same is locked so that it cannot be accidentally moved to on position.

The structures contemplated are strong and durable, composed of a minimum number of parts and so arranged that a positive sure locking action is obtained. More specifically, the invention is concerned with structure where there is a valve member rotatably mounted in a valve seat and the valve member is provided with an operating stem which serves to rotate the valve member. The stem is capable of a certain movement relative to the valve member, and this movement takes place when the valve is in off position so that the stem shifts to bring interengaging locking agencies into cooperation to lock the stem, and thereby the valve, against rotation so long as the stem remains in the position to which it has shifted. In the present structure the stem is axially shiftable relative to the valve member, and the connection between the stem and valve member is such as to permit of this movement but which at the same time provides a strong durable connection between valve and stem, which holds them at all times so that they have rotary movement in unison. This connection preferably comprises interfitting male and female parts provided with splines or serrations. Moreover, the improved structures, and this is an object of invention, embodies an element wherein the several parts can be assembled only in one relation so that automatically, upon assembly, the valve will be off when the stem is locked against rotation. This prevents an assembly which might result in having the valve on when the stem is locked against rotation.

In the accompanying drawings:

Fig. 1 is a general view showing the valve in association with a manifold and a gas burner, the manifold and gas burner being shown in broken lines.

Fig. 2 is an enlarged view showing the valve structure in longitudinal section.

Fig. 3 is a sectional view taken substantially on line 3—3 of Fig. 2.

Fig. 4 is a view showing the several parts of the valve in disassociated relation and showing some of said parts in cross-section.

Fig. 5 is a view showing some of the parts of the valve as illustrated in Fig. 4 in end elevation and partially in cross-section.

Fig. 6 is a view of a modified form of the invention showing part of the valve structure in cross-section, and taken substantially on line 6—6 of Fig. 7.

Fig. 7 is an end view of the valve and stem with the operating handle shown in broken lines.

Fig. 8 is an enlarged view of the valve shown in Fig. 6 showing the same largely in longitudinal section.

Fig. 9 is a sectional view taken on line 9—9 of Fig. 8.

Fig. 10 is a sectional view taken on line 10—10 of Fig. 8.

Fig. 11 is a detail view of the cap.

The body of the valve is shown at 1, and it has a screw threaded projection 2 for connection with a gas pipe or manifold 3 and a screw threaded projection 4 equipped with a suitable jet 5 disposed in cooperative relation with the inlet pipe 6 of a gas burner. It is to be understood, of course, that the inlet member 2 and outlet member 4 are provided with gas passageways which connect into the hollow interior of the body member 1 and which are to be connected and disconnected by a rotary valve member. The interior of the member which is provided with a tapered valve seat 7 and the end opposite the outlet member 4 is screw threaded and provided with a notch 8.

A valve member is shown at 10 and it is cored out to form a port 11 which connects into a longitudinal bore 12 which extends out through the small end of the valve into communication with the outlet member 4; and it will be understood that when the valve member is rotated to bring the port 11 into alignment with the inlet member 2 gas may flow through the port 11 and bore 12 and out through the valve into the burner 6; that when the port 11 is disaligned from the inlet member 2 the gas flow is stopped.

The end of the valve member opposite the port 11 is provided with an axial bore 13 provided with serrations or splines 14. These may be provided by a suitable broaching operation. A cage, generally shown at 15, is provided, the same being in the form of a ring having a projection 16 for fitting into the notch 8. The valve body is provided with a shoulder 17, against which the cage may abut, as illustrated in Fig. 2. The portion of the cage remote from the shoulder 17 may be of reduced diameter, as shown, and the cage is provided with an axially extending slot 18 and a circumferential slot 19. The slot 19 is defined at one end by a wall portion 20 and at the other by a wall portion 21. This constitutes a bayonet slot formation.

The operating stem is shown at 25 and it may have an enlarged or shoulder portion 26, and one end is serrated or splined as at 27 to be slidably received in the bore 13. This stem is provided with a projection such as a pin 28 for cooperation with the slots in the cage, and one end may be flattened as at 29 for the reception of an operating handle 30. The formation of the interfitting portions of the valve and stem are provided with identifying portions, by means of which the stem and valve can be assembled only in one of numerous relative positions. To this end the bore 13 may be serrated uniformly, except for the omission of one groove, leaving an ungrooved or unbroken part 31 (Fig. 5); the serrations 27 on the stem may be uniform except at one place where one rib-like part is omitted, leaving an unbroken or substantially flat-like portion 32. The parts 31 and 32 must register before the serrated end of the stem may be inserted in the serrated end of the valve. A cap is shown at 33, the same having an aperture through which the stem extends and internally threaded for cooperation with the threads on the body of the valve. Spring means is employed to exert a controlling action on the relative axial movement on the stem and valve, and to this end a coil spring 35 is placed in the bore of the valve and arranged to react against the end of the stem. A solid wall or partition 36, integral with the valve, separates the gas flow bore 12 and the serrated bore 13.

The assembly of the valve and operation of the same is as follows: The valve member is first disposed in its seat in the body, then the cage is positioned on the body and it is positively located by the projection 16; this likewise locates the slot 18; the spring and stem are now to be positioned. Inasmuch as the identifying portions 31 and 32 must be in alignment, the assembly cannot be made unless the pin 28 and slot 18 are also in alignment; therefore, the valve member must be in off position before assembly can be made; and in the factory assembly of the valve this position will be correctly attained when the valve member is placed in the valve body in the first instance. Thus, when the identifying parts 31 and 32 are brought into alignment, pin 28 aligns with the slot 18 and the spring 35 is placed under compression, whereupon the cap 33 is positioned and screw threaded to the body. The spring urges the stem away from the valve body and the shoulder 26 abuts against the cap, as shown, and at the same time forces the valve member against its seat. To turn the valve to on position the stem first has to be pushed inwardly compressing the spring 35 so that the pin 28 is located in the slot 19, then the stem and valve may be turned, and when the pin stops against the wall 21 the valve is open. The stem is rotated in the opposite direction to close the valve, and it is closed when the pin strikes the wall 20, at which time the spring forces the stem outwardly and the pin is locked in the slot 18.

By this arrangement a strong valve structure is obtained. Heretofore, the end of the valve body has been slotted to provide a lock arrangement for the stem. This is objectionable because a slot of substantial extent is required, thus cutting away the screw threads on the valve body to an undesirable extent. This makes the connection of the cap with the valve body weak, unless the valve body is increased in length. With the present arrangement no increase of length of the valve body is required since the slot 8 is only very small for the purpose of locating the cage, and the effectiveness of the first few threads on the valve body are not materially interfered with. It will be apparent by considering Fig. 2 that the spline connection between the valve and stem is not of great depth when the valve is off, but this is increased when the stem is pushed in to first unlock the stem, so that any time the valve is rotated by the stem, the spline connection is substantially at its full depth.

A modified form of the invention is shown in Figs. 6 to 10 inclusive, and in these figures the valve body, the valve itself, the stem and other associated parts are similar to these parts shown in Figs. 1 to 5 inclusive, and the same reference characters are applied. In this form the valve and stem member have the same spline connection with the interpositioned spring.

In this form, however, instead of utilizing a cage for controlling the stem, the cap is formed to provide a locking and controlling action on the stem. To this end the cap may be a sheet metal stamping formed with oppositely projecting ears 40 and 41, to be fastened to a similar formation on a valve body by screws 42. The cap is preferably formed with a circular aperture bounded by a flange 43 to form a bearing for the stem, and the stem is equipped with a cross pin 44. The cap is formed with two opposite radial depressions 45 into which the opposite ends of the pin are forced by the spring when the valve is off, as shown in Fig. 6, and thus the stem and valve are locked against rotation. The cap is also formed with plain surfaces 46 located intermediate the bottoms of the recesses 45 and the rim of the cap. There is a plain surface on one side of each depression 45. On the opposite side of each depression are inwardly pressed portions 46 which may rise substantially to the edge of the cup-shaped cap, and each forming an abutment 47.

In assembling this valve the valve member is disposed in the valve body preferably in off position and then the cap and stem are assembled by tightening the screws 42, at which time the pin 44 is located in the recesses 45. To turn the valve, the stem is pushed inwardly to a position indicated in Fig. 8, and then the same is rotated until the pin stops against the shoulders 47 and the valve is on. When the valve is turned off the spring snaps the stem axially and the ends of the pin seat in the recesses 45. The valve cannot be turned past off position when it is being closed, since the ends of the pin strike the shoulders 48 formed by the portions 46, which shoulders are in alignment with one wall of the recesses 45.

I claim:

1. A locking valve comprising, a valve body having a seat, a valve member on the seat, said body and valve member having passageways to be brought into and out of registry by relative rotation, a bore in the valve member provided with internal serrations; a stem having an externally serrated end in said bore and readily slidable in an axial direction in said bore, a spring in the bore acting on the stem to urge it away from the valve member, a locking projection non-rotatably fixed on the stem positioned inwardly from the serrated end, and interengaging locking means for receiving the projection and holding the stem against rotation when the stem is held away from the valve member, said projection being disengaged from the locking means by movement of the stem toward the valve member whereby the stem and valve may be rotated relative to the valve body.

2. A locking valve comprising, a valve body having a seat, a valve member on the seat, said body and valve member having passageways to be brought into and out of registry by relative rotation, a bore in the valve member provided with internal serrations, a stem having an externally serrated end slidably fitted in the bore for relatively easy sliding movement, the serrations in the bore and on the stem being similarly interrupted whereby the end of the stem may be located in the bore in only one of numerous relative positions of the stem and valve member, a spring in the bore acting on the stem and urging it away from the valve member, locking means held fixed as regards the valve body, a locking element non-rotatably fixed on the stem and positioned inwardly from the serrated end and urged into cooperative relation with the locking means by said spring, the locking element being shiftable out of cooperative relation with the locking means by axial movement of the stem against the spring whereby the stem and valve member may be rotated, the interruption of the serrations on the stem being so co-related with the position of the locking means that when the locking means is effective on the locking element the valve member is in off position.

3. A locking valve comprising, a valve body having a seat, a valve member on the seat, said body and valve member having passageways to be brought into and out of registry by relative rotation, a bore in the valve member provided with internal serrations, a stem having an externally serrated end in the bore and readily slidable in the bore, said bore and stem having a portion which is not serrated, and said portions being similar whereby the bore and stem may be fitted together in only one position, a spring in the bore acting on the stem and urging it away from the valve member, locking means fixed relative to the valve body, a locking element non-rotatably fixed on the stem positioned inwardly of and adjacent to the serrated end, said locking element being in cooperative relation with the locking means when the stem is urged away from the valve member by the spring, said locking means and the said unserrated portion of the said stem being so co-related that when the locking element is in cooperative relation with the locking means the valve member is in off position, said locking element being brought out of cooperative relation with the locking means upon axial movement of the stem toward the valve member.

4. A locking valve comprising, a valve body having a seat, a valve member on the seat, said body and valve member having passageways to be brought into and out of registry by relative rotation, a bore in the valve member provided with internal serrations, a stem having an externally serrated end slidably fitted in the bore for relatively easy sliding movement, said serrations being similarly non-uniform whereby the stem and valve member may be assembled in only one position, a spring in the bore urging the stem away from the valve member, means limiting the movement of the stem away from the valve so that the serrations remain interfitted, locking means fixed relative to the valve body, a locking pin extending through the stem and positioned inwardly of the serrated end, said locking pin being in cooperative relation with the locking means when the stem is urged away from the valve member by the spring and being disengaged from the locking means when the stem and pin are shifted axially against the action of the spring, the locking means and the non-uniform formation of the serrations on the stem being so co-related that when the locking means and locking pin are in cooperative relation the valve member is in off position.

5. A locking valve comprising, a valve body having a valve seat, a valve member rotatable on the seat, a bore in the valve provided with internal serrations, a stem having an externally serrated end fitted in the bore, a spring in the bore acting on the stem, a cage, said valve body having a notch and the cage having a projection for fitting in the notch, said cage having a bayonet slot, a locking pin on the stem positioned inwardly of the serrated end for cooperation with the bayonet slot, a cap through which the stem extends and fitted to the valve body for holding the cage in place, means on the stem which reacts against the cap to hold the serrated end of the stem in the bore, the spring holding the stem in a position so that the locking pin thereon is locked in a portion of the bayonet slot, and the stem being shiftable against the spring to position the pin in another portion of the bayonet slot, whereby the stem and valve may be rotated, the serrations in the bore and on the stem being provided with relatively flat portions so that the stem and valve member may be assembled only in a predetermined relative position, and said flat portion on the stem and locking part of the bayonet slot being so co-related that when the stem is locked the valve member is in off position.

6. A locking valve comprising a valve body having a valve seat, a valve member rotatable on the seat, said valve body and valve member having passageways to be brought into and out of registry by relative rotation, a bore in the valve member provided with serrations, a stem having a serrated end slidably fitted in the bore, a spring in the bore acting upon the stem and urging it away from the valve member, a cap member through which the stem extends, means securing the cap member to the valve body, oppositely positioned projections on the stem, said cap member being provided with oppositely positioned recesses into which the projections move by action of the spring to lock the stem against rotation, said stem member being shiftable against the spring to position the projections out of the recesses whereby the stem and valve member may be rotated, said cap member having oppositely positioned substantially flat surfaces against which the projections abut by action of the spring upon rotation of the stem and valve member.

7. A locking valve comprising, a valve body having a valve seat, a valve member rotatable on the seat, said valve body and valve member having passageways to be brought into and out of registry by relative rotation, a bore in the valve member provided with serrations, a stem having a serrated end slidably fitted in the bore, a spring in the bore acting upon the stem and urging it away from the valve member, a cap member through which the stem extends, means securing the cap member to the valve body, oppositely positioned projections on the stem, said cap member being provided with oppositely positioned recesses into which the projections move by action of the spring to lock the stem against rotation, said stem member being shiftable against the spring to position the projections out of the recesses whereby the stem and valve member may be rotated, said cap member having oppositely positioned substantially flat surfaces against which the projections abut by action of the spring upon rotation of the stem and valve member, said cap member being formed with oppositely positioned abutments against which said projections stop to limit the rotation of the stem and valve member when the valve member is in on position.

8. A locking valve comprising, a valve body having a valve seat, a valve member rotatable on the seat, said valve body and valve member having passageways to be brought into and out of registry by relative rotation, a bore in the valve member provided with serrations, a stem having a serrated end slidably fitted in the bore, a spring in the bore acting upon the stem and urging it away from the valve member, a cap member through which the stem extends, means securing the cap member to the valve body, oppositely positioned projections on the stem, said cap member being provided with oppositely positioned recesses into which the projections move by action of the spring to lock the stem against rotation, said stem member being shiftable against the spring to position the projections out of the recesses whereby the stem and valve member may be rotated, said cap member having oppositely positioned substantially flat surfaces against which the projections abut by action of the spring upon rotation of the stem and valve member, said cap member being formed with oppositely positioned abutments against which said projections stop to limit the rotation of the stem and valve member when the valve member is in on position, said abutments each terminating substantially in alignment with one wall of each recess to stop rotation of the stem as it is turned to off position with the projections in alignment with the recesses.

9. A locking valve comprising, a valve body having a valve seat, a valve member rotatable on the seat, said valve body and valve member having passageways to be brought into and out of registry by relative rotation, a bore in the valve member provided with serrations, a stem having a serrated end slidably fitted in the bore, a spring in the bore acting upon the stem and urging it away from the valve member, a cross pin carried by the pin having extending ends, a sheet metal cap member through which the stem extends and secured to the valve body, said cap member being of cup form and having oppositely disposed recesses, each defined on one side by an abutment, said cap having oppositely disposed plain surfaces, each terminating at one end at one of the recesses and defined at its opposite end by one of the abutments, the serrations in the bore and on the stem having non-uniform portions whereby the stem and valve may be assembled in only a predetermined relative position, and the non-uniform portion on the stem being so co-related with the recesses in the cap that when the ends of the pin are located in said recesses and the stem locked against rotation, the valve member is in off position.

10. A locking valve comprising, a valve body with a valve seat, a valve member rotatable on the seat, said valve body and valve member having passageways to be brought into and out of alignment by relative rotation, an axial bore in one end of the valve member projecting into the portion of the valve member which is disposed on the valve seat, the walls of the bore having internal serrations therein extending lengthwise of the bore, an operating stem having an externally serrated end located in the bore and readily slidable axially therein with the serrations interfitting to form a non-rotatable connection, a spring in the bore and acting upon the stem to urge it away from the valve member, a cap through which the stem extends and which is secured to the valve body for taking the thrust of the stem, a locking member carried by and projecting outwardly from the stem and positioned on the stem inwardly of the serrated end, and means providing a recess for receiving the locking member when the stem is urged against the cap by the spring to lock the stem against rotative movement, said locking member being movable with the stem and out of the recess by axial movement of the stem toward the valve member against the action of the spring, whereby the stem may be rotated and the valve rotated thereby.

11. A locking valve structure comprising, a valve body having a valve seat, a valve member in the valve body and rotatable on the seat, said body and valve member having passageways to be brought into and out of registry by relative rotation, an axial bore in one end of the valve member which projects into the valve seat when the valve member is on the seat, said bore having internal serrations on its walls, a stem with an externally serrated end positioned in the bore and readily slidable therein axially with the serrations cooperating to provide a non-rotatable connection, a spring in the bore urging the stem away from the valve member, a cap through which the stem extends and which is secured to the valve body, abutment means on the stem positioned inwardly from the serrated end for abutment against the cap by the action of the spring, a locking pin carried by the stem and positioned in a fixed location adjacent the inner portion of the serrated end of the stem, and a cage having a ring-like body member non-rotatably connected with the valve body and a tubular extension telescoping into the cap and supported thereby, said tubular extension having a bayonet slot, one arm of which provides a locking recess for the pin when the abutment means on the stem is against the cap and out of which the pin is movable by axial movement of the stem, and the other arm of which accommodates the pin upon rotary movement of the stem.

12. A locking valve structure comprising, a valve body with a valve seat therein, a valve member rotatable on said seat, one end of the valve member having an axial bore therein provided with internal serrations extending lengthwise of the valve member, a valve stem arranged to receive a handle on one end and having lengthwise extending serrations on its opposite end arranged to freely and slidably fit into said bore to provide a relatively slidable and non-rotatable connection between the stem and the valve member, a cap member secured to the body and through which the valve stem extends, locking means in the form of a projection non-rotatably carried by the stem and projecting outwardly therefrom, spring means acting upon the valve member and stem and tending normally to separate them with the reaction being taken by the valve body and by said cap, said stem together with the locking means being shiftable axially relative to the valve member against the action of the spring means, and means non-rotatably fixed to the valve body having a locking notch for receiving the locking projection when the stem is urged into a position relatively remote from the valve member by said spring means, whereby the stem is locked against rotation, said locking projection being shiftable out of the said notch by axial movement of the stem toward the valve member whereby the stem, and thereby the valve member, may be rotated relative to the valve body.

13. A locking valve structure comprising, a valve body with a valve seat therein, a valve member rotatable on the seat, one end of the valve member having an axial bore therein provided with internal serrations extending lengthwise of the valve member, a valve stem for rotating the valve member having lengthwise extending serrations on one end arranged to freely and slidably interfit with the serrations in said bore to provide a relatively slidable non-rotatable connection between the stem and the valve member, spring means acting upon the valve member and stem, a locking element non-rotatably associated with the valve member and stem, and a cooperating locking element non-rotatably associated with the valve body, said spring serving to shift the stem axially relative to the valve body and to hold the locking elements in interlocking relation, whereby to lock the valve and stem against rotation, said valve stem being shiftable axially relative to the valve body on said interfitting serrations by pressure applied to overcome the action of the spring to effect disengagement of the locking elements, whereby the valve member may be rotated on its seat through the means of the stem and interfitting serrations.

14. A locking valve structure comprising, a valve body with a valve seat therein, a valve member rotatable on the seat, a stem member for rotating the valve member, one of said members having an axial bore therein provided with internal serrations extending lengthwise, the other member having lengthwise extending serrations on one end and the said serrations on the two members arranged to freely and slidably interfit to provide a relatively slidable non-rotatable connection between the stem member and the valve member, spring means acting upon the stem member, a locking element non-rotatably associated with the valve member and stem member and a cooperating locking element non-rotatably associated with the valve body, said spring means serving to shift the stem member axially relative to the valve body and to hold the locking elements in interlocking relation whereby to lock the valve member and stem member against rotation, said stem member being shiftable axially relative to the valve body on said interfitting serrations by pressure applied to overcome the action of the spring means to effect disengagement of the locking elements whereby the valve member may be rotated on its seat through the means of the stem member and interfitting serrations.

ERVIN H. MUELLER.